Jan. 23, 1962 S. ZWEIG 3,017,670
PROCESS FOR PRODUCING PLASTIC ARTICLES
Filed April 4, 1957
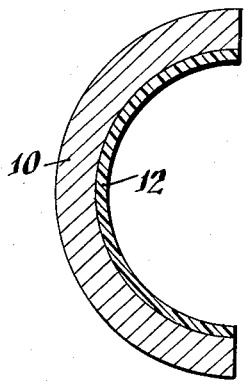
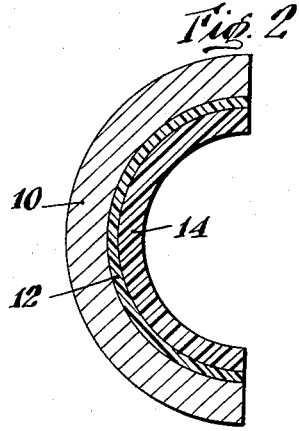
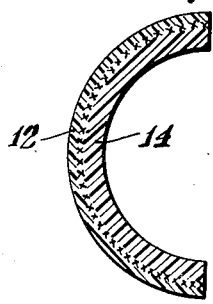
INVENTOR
Samuel Zweig
BY
Robert Calvert
ATTORNEY 3,017,670
PROCESS FOR PRODUCING PLASTIC ARTICLES
Samuel Zweig, Chicago, Ill., assignor to The Borden Company, a corporation of New Jersey
Filed Apr. 4, 1957, Ser. No. 650,759
3 Claims. (Cl. 18—59)

This invention relates to protecting articles of plasticized plastic against development of tackiness of an external surface of the article.

The invention is particularly useful in connection with polyvinyl chloride plastics and will be illustrated, therefore, by description in connection with such use.

When plasticized polyvinyl chloride compositions are formed in usual manner, as by rotational molding, slush molding, or coating, the articles so produced frequently show exudation of plasticizer, greasiness of the surface, or a tendency to collect dust, the undesirable effects being accompanied by stickiness or tackiness and being particularly pronounced after severe exposure of the articles to sunlight.

I have now discovered a process and composition that reduces the tackiness to a minimum and, for practical purposes, eliminates it. I use a sealing or blocking film over the outer surface. The material of this film is not insoluble in the plasticizer used in the inner portion but has in fact a higher tolerance for the plasticizer than has the inner or body portion of the article. The film is similar in chemical composition to the main body (inner portion) of the article. The film and the body portion of my product become in effect integral at the zone of union of the two and non-separating. Because of the similarity of chemical compositions, there is no distortion, over a wide range of temperature, such as might result if materials were widely different and the coefficients of expansion were unequal in the surface and body portion of the article.

The invention will be further illustrated by description in connection with the attached drawing to which reference is made.

FIG. 1 shows in section a fragment of a mold prepared for molding a plasticized plastic therewithin;

FIG. 2 is a similar view of the prepared mold with a fragment of the molded article in position; and FIG. 3 is a similar sectional view of such fragment of the molded article with the sealing layer fused to the body portion, after separation from the mold.

In these drawings the thickness of the sealing film is exaggerated with respect to the thickness of the mold and of the plasticized plastic. The details of construction and shape of the mold may be any that are conventional, for example, in rotational molding.

There are shown mold 10 with the sealing or blocking film 12 applied therein and then bonded continuously over the outer surface of the wall of the molded article 14. The crosses or x's in FIG. 3 show some blending of layers 12 and 14 at the zone of bonding only.

The process in general includes first the application, to the inner surface of the female mold, of the plastic material that is to form the sealing film. This application is made to advantage by coating the inner surface of the mold with a volatile solvent solution of the sealing material to leave a film of final thickness about 0.00005–0.001 inch. Then the volatile solvent is removed as by evaporation either in air at ordinary temperature or by passing air over the coated surface at moderately elevated temperature.

Into the mold so coated with the film there is then introduced the combination of plastic and plasticizer therefor that are to constitute the body or inner portion of the molded article. Suitably the plastisol technique is followed. In this the plastic, in finely divided solid form, is suspended in proper proportion in the liquid plasticizer, the suspension is then shaped in the film lined mold, as by the said rotational process, and the whole is heated to the temperature at which the plasticizer and said plastic dissolve in each other to give a viscous fluidized substantially homogeneous mass that, on cooling, becomes a shape-retaining (solid) plastic. This temperature of warming is also sufficiently elevated to cause the blocking film first applied to become softened and bonded, as if by integral "welding" or, more accurately, union by partial fusion at its surface of contact with the outer surface of the plasticized plastic of the inner or body portion. Suitable temperatures for such heating are 250°–450° F. and for best results normally about 300°–400° F.

The heating is discontinued when the solution and bonding have been effected and the product is cooled before the plasticizer penetrates through the said film 12, that is to the surface thereof in contact with mold 10.

The mold and contents are then cooled, to convert all of the materials within the mold to solid plastic or firm condition. Finally the mold is opened and the composite molded product removed.

As to materials, the inner or body portion of the article is made to advantage with polyvinyl chloride plastic, that is, polyvinyl chloride itself (PVC); or a copolymer of approximately 85–99 parts of polyvinyl chloride with a material in amount to make 100 parts of copolymer, as with acrylonitrile, maleic anhydride, vinyl acetate (PVAC), propionate, or butyrate, or vinylidene chloride.

The intrinsic viscosity of the polyvinyl chloride plastic for the inner portion may be varied over a wide range, as for example, an intrinsic viscosity of about 0.7–1.5, i.e. before plasticization. The intrinsic viscosity used herein is that measured by the standard technique for intrinsic viscosity, in cyclohexanone solution of the material tested at 20° C.

As to the plastic material of the sealing or blocking film, this must have a tolerance for the plasticizer (of the inner portion) at least equal to that of 100% PVC of intrinsic viscosity 0.8 and for best results equal to PVC of intrinsic viscosity about 1–1.6. I may and ordinarily do use any of the said polyvinyl chloride plastics in unplasticized condition provided they are of high viscosity, as, for example, of intrinsic viscosity at least 1 and for best results 1.2–1.6.

Particularly suitable for the outer film is a polyvinyl chloride plastic consisting of a mixture of copolymer of vinyl chloride and vinyl acetate mixed with 30–70 parts of a polyalkylmethacrylate such as polymethyl-, polyisopropyl-, or polyisobutylmethacrylate, to make 100 parts of the blend. When the said mixture or blend is used, then the intrinsic viscosity of the film material may be as low as 0.5 or even somewhat lower.

With such type of material in the blocking film, there is high tolerance for plasticizer, because either of the high viscosity or of the acrylate component. When these values for plastic of the sealing film are substantially lower, exudation or tackiness of surface develops.

In any case, the plastic of both the inner part of the article and of the blocking film must be softenable at a temperature of 300°–400° F. so that they will "weld" at the temperature of heating.

Examples of polyvinyl chloride plastics that may be used in my article are illustrated in the following table. These plastics contain, in each instance, polyvinyl chloride in the percentage shown. The remainder of the plastic is polyvinyl acetate. The last column shows the percentage of plasticizer such as dioctyl phthalate, on the weight of the unplasticized plastic, that may be tolerated without the film being tacky at ordinary temperatures.

| PVC | Intrinsic Viscosity | Plasticizer Tolerance, percent |
|---|---|---|
| 85–88 | 0.53 | 15 |
| 90 | 0.79 | 25 |
| 96 | 1.25 | 50 |
| 91 | 1.38 | 50 |
| 96+ | 1.52 | 50+ |
| 100 | 1.52 | 50+ |

A blend of 50 parts of polymethylmethacrylate with 50 parts of the copolymer of 85% vinyl chloride and 15% vinyl acetate, used as the plastic of the sealing film, gives an article of desired balance of satisfactory protection against development of tackiness, flexibility of film, and low viscosity for a given concentration of film plastic in methyl ethyl ketone solution at the time of coating the mold.

A plasticizer for the plastic of the inner portion is any one of the usual polyvinyl chloride plasticizers that is liquid at ambient temperatures. These plasticizers are substantially non-volatile solvents for the polyvinyl chloride. Examples are dioctyl or dinonyl phthalate and sebacate, tricresyl phosphate and mixtures thereof.

The volatile solvent if any used in applying the initial coating, that is to form the film 12 and block the exudation of plasticizer on the outer surface in the final product, is a usual non-corrosive volatile solvent for the materials that are to form the solid of the film. Economical examples are methyl ethyl ketone, methyl isobutyl ketone, and toluene, used alone or mixed. A suitable proportion of the solvent is 100–500 parts by weight for 100 of the solids of the film.

The proportion of the plasticizer to the polyvinyl chloride plastic in the main or inner portion of the article is the proportion that is usual in rotational molding of PVC. It will vary somewhat with the specific effectiveness of the plasticizer selected and with firmness or the flexibility desired. It is ordinarily 20–50 parts for 100 of combined weight of the plasticizer and PVC plastic.

The invention will be illustrated in further detail by description in connection with the following specific examples of the practice of it. In these examples and elsewhere herein, proportions are expressed as parts by weight and the intrinsic viscosity is that sometimes referred to as the "limiting viscosity number" (Kirk and Othmer, Enc. Chem. Tech. 10 967). The intrinsic viscosity is understood to refer to the relative increase in viscosity of the solution per gram of added solute extrapolated back to zero concentration of solute, here measured in cyclohexanone as the solvent and at 20° C.

*Example 1*

Fifty parts of a mixture of equal parts of polyvinyl chloride of intrinsic viscosity about 0.79 and polymethylmethacrylate, the mixture being of intrinsic viscosity about 0.5, are dissolved in 400 parts of methyl ethyl ketone. This solution is sprayed over the interior of the two halves of a rotational mold in amount to leave finally a film about 0.0005 inch thick. The solvent is then evaporated at a temperature of about 100°–200° F. in a stream of air. Into one of the halves of the mold with the thus coated inner surface, there is introduced a plastisol comprising 55 parts of polyvinyl chloride plastic such as one (96% PVC, 4% PVAC) of intrinsic viscosity about 1.5 and 45 parts of dioctyl phthalate plasticizer. It and the dioctyl phthalate are used in the form of a plastisol, that is, a suspension of the PVC plastic in the liquid plasticizer. This plastisol is layered over the inside of the blocking film, by rotating the mold on two axes, in accordance with standard technique for rotational molding as described in Modern Plastics for September 1956, page 688, the temperature being raised during the molding operation to 350° F.

This melts together the plasticizer and the plastic suspended therein and also fuses the resulting homogeneous fluid mass to the interior surface of the blocking film first applied to the mold.

When the melting and fusion are completed and before the plasticizer can diffuse completely through or even to the mid zone of film 12, the mold and its contents are cooled, opened and the molded product is removed. The time required at the elevated temperature for the results described is very short and is determined, for a given mix and for a given set of conditions, by a few preliminary tests.

In a modification of this example, the ketone is replaced by an equal weight of half xylene and half methyl ethyl ketone.

In another modification, the spraying is omitted and the solution is applied to the mold by being brushed on.

*Example 2*

The procedure of Example 1 is followed except that the composition first applied to the interior of the mold to prevent the blocking film is a solution of a polyvinyl chloride plastic of intrinsic viscosity 1.38 containing no methacrylate, as, for instance, a solution of the described copolymer of 91% vinyl chloride and 9% vinyl acetate.

The inner or body portion is a plastisol of 55 parts copolymer of vinyl chloride and vinyl acetate (of intrinsic viscosity 1.52) with 45 parts dioctyl phthalate.

In a modification of this example, the plastic of the blocking film is polyvinyl chloride of intrinsic viscosity 1.52 with no material copolymerized and no other plastic blended therewith.

*Example 3*

The procedure of Example 1 is followed exactly except that the methyl methacrylate there used is replaced by an equal weight of any of the other alkyl methacrylates disclosed herein.

*Example 4*

The procedure of any of the Examples 1–3 is followed exactly except that the dioctyl phthalate there used is replaced by an equal weight of any of the other plasticizers disclosed herein.

*Example 5*

The procedure and proportions of any of the Examples 1–4 are followed exactly, except that the plastics used in the solution for forming (1) the said solution and (2) the said plastisol are replaced in turn on an equal weight of any of the other mixtures or copolymers disclosed for the same use.

Articles made as described and then exposed to sunlight remain free substantially indefinitely from any exudation of the plasticizer through the film 12. The exposed surface of the film 12 remains free from greasiness and tackiness.

It is to be understood that it is intended to cover all changes and modifications of the examples of the invention herein chosen for the purpose of illustration which do not constitute departures from the spirit and scope of the invention.

I claim:

1. In making, within a mold, an article including polyvinyl chloride and migratory plasticizer therefor and protecting the article against exudation of plasticizer from the outer surface of the article, the process which comprises coating the interior of the mold with an unplasticized sealing film about 0.00005–0.001 inch thick of thermoplastic material that is soluble in the said plasticizer and that, without becoming tacky, tolerates the said plasticizer in proportion thereof in excess of the proportion tolerated by the polyvinyl chloride and that is of intrinsic viscosity at least 0.8 in cyclohexanone at 20° C., molding against the sealing film a mixture of the said polyvinyl chloride and migratory plasticizer therefor, heating the whole to a temperature of fluidizing the said mixture and softening and surface union of the sealing film to the resulting plasticized polyvinyl chloride plastic, and then cooling the product before the said plasticizer penetrates through the sealing film, the plasticized polyvinyl chloride plastic after the cooling having an intrinsic viscosity substantially less than that of the material of the said film.

2. The process of claim 1 in which the said polyvinyl chloride is a copolymer of vinyl chloride and vinyl acetate, in the proportion of 85–96 parts of the chloride to 100 of total weight of the chloride and acetate, and the proportion of the said plasticizer in the said polyvinyl chloride plastic is 20–50 parts for 100 of the polyvinyl chloride.

3. In molding an article having a plastic body portion, the process which comprises applying to the mold surface a volatile solvent solution of polyvinyl chloride of intrinsic viscosity in cyclohexanone at 20° C. of at least 0.8, evaporating the solvent to leave a film of the plastic material, applying over the film a plastisol comprising polyvinyl chloride of intrinsic viscosity substantially below that of the polyvinyl chloride in the said solution and a liquid substantially non-volatile solvent plasticizer for the polyvinyl chloride of the plastisol, the applied material being in amount to form the said body portion of the article, and then heating the film and applied plastisol to the molding temperature of fluidizing the plastisol as a substantially homogeneous mass and of softening of the said film, so that the said film becomes bonded at its surface of contact with the fluidized mass, and then cooling the product before the said plasticizer penetrates through the said film, the plasticized polyvinyl chloride plastic after the cooling having an intrinsic viscosity substantially less than that of the material of the said film.

References Cited in the file of this patent

UNITED STATES PATENTS

| | | |
|---|---|---|
| 2,176,997 | Marini | Oct. 24, 1939 |
| 2,184,876 | Sherts | Dec. 26, 1939 |
| 2,453,052 | Van Etten | Nov. 2, 1948 |
| 2,491,102 | Frowde | Dec. 13, 1949 |
| 2,729,585 | Gruber et al. | Jan. 3, 1956 |
| 2,744,340 | Gerber | May 8, 1956 |
| 2,792,322 | Fredericks | May 14, 1957 |
| 2,815,896 | Shapero et al. | Dec. 10, 1957 |

FOREIGN PATENTS

| | | |
|---|---|---|
| 516,368 | Great Britain | Jan. 1, 1940 |
| 595,632 | Great Britain | Dec. 11, 1947 |